(12) United States Patent
Nathan et al.

(10) Patent No.: US 8,066,324 B2
(45) Date of Patent: Nov. 29, 2011

(54) REDUCED POWER HEAT MAT

(75) Inventors: John F. Nathan, Highland, MI (US);
Karl Kennedy, Fraser, MI (US); H. Winston Maue, Farmington Hills, MI (US); Santosh Karumathil, Maharastra (IN)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 11/821,984

(22) Filed: Jun. 26, 2007

(65) Prior Publication Data
US 2009/0001778 A1    Jan. 1, 2009

(51) Int. Cl.
*A47C 7/74* (2006.01)

(52) U.S. Cl. .................. 297/180.12; 297/180.1

(58) Field of Classification Search ............. 297/180.12, 297/180.13, 180.14, 217.3, 452.42, 180.1, 297/180.11
See application file for complete search history.

(56) References Cited

U.S. PATENT DOCUMENTS

| | | | |
|---|---|---|---|
| 3,136,577 A * | 6/1964 | Richard | 297/180.11 |
| 4,590,359 A | 5/1986 | Mobius | |
| 5,518,176 A | 5/1996 | Turner et al. | |
| 5,524,439 A * | 6/1996 | Gallup et al. | 62/3.5 |
| 5,626,021 A | 5/1997 | Karunasiri et al. | |
| 5,839,788 A * | 11/1998 | Orr, III | 297/452.41 |
| 5,948,297 A | 9/1999 | Haubner et al. | |
| 6,064,036 A | 5/2000 | Kensrue | |
| 6,064,037 A | 5/2000 | Weiss et al. | |
| 6,079,485 A | 6/2000 | Esaki et al. | |
| 6,093,910 A | 7/2000 | McClintock et al. | |
| 6,150,642 A | 11/2000 | Weiss et al. | |
| 6,164,719 A | 12/2000 | Rauh | |
| 6,179,378 B1 | 1/2001 | Baumgartner et al. | |
| 6,273,810 B1 * | 8/2001 | Rhodes et al. | 454/120 |
| 6,371,552 B1 | 4/2002 | Narita et al. | |
| 6,531,687 B2 | 3/2003 | Michelmann | |
| 6,540,303 B2 | 4/2003 | Mosquera | |
| 6,578,910 B2 | 6/2003 | Andersson et al. | |
| 6,629,725 B1 | 10/2003 | Kunkel et al. | |
| 6,682,494 B1 * | 1/2004 | Sleichter et al. | 601/57 |

(Continued)

FOREIGN PATENT DOCUMENTS
DE        19503291 A1    8/1996
(Continued)

OTHER PUBLICATIONS

Wolfe, Ned; Mu, Xiaoxia; Huang, Linjie & Kadle, Prasad. "Cooling with Augmented Heated and Cooled Seats," Delphi Thermal Systems, Lockport, NY 14094, Jan. 2007 SAE International.

(Continued)

*Primary Examiner* — Rodney B White
*Assistant Examiner* — Joseph Edell
(74) *Attorney, Agent, or Firm* — MacMillan, Sobanski & Todd, LLC (57) ABSTRACT

A vehicle seat assembly includes a seating surface, wherein the seating surface defines a plurality of temperature controlled zones. At least one electrically actuated heating/cooling source provides one of heating and cooling to the plurality of zones. A controller individually controls electrical power supplied from the source to each zone and is operative to reduce power consumption in one zone relative to another zone in accordance with a predetermined profile designed to limit the overall power consumption of the assembly.

20 Claims, 4 Drawing Sheets

U.S. PATENT DOCUMENTS

| | | | |
|---|---|---|---|
| 6,733,072 B2 * | 5/2004 | Jaillet et al. | 297/180.13 |
| 6,812,431 B2 | 11/2004 | Morinet et al. | |
| 6,831,565 B2 | 12/2004 | Wanami et al. | |
| 6,928,829 B2 | 8/2005 | Kamiya et al. | |
| 7,205,510 B2 | 4/2007 | Howick | |
| 7,320,223 B1 * | 1/2008 | Dabney et al. | 62/3.3 |
| 2003/0039298 A1 | 2/2003 | Eriksson et al. | |
| 2004/0026405 A1 * | 2/2004 | Alvite et al. | 219/486 |
| 2007/0017666 A1 | 1/2007 | Goenka et al. | |
| 2007/0214800 A1 * | 9/2007 | Kadle et al. | 62/3.3 |
| 2007/0290532 A1 * | 12/2007 | Frank | 297/180.12 |
| 2008/0083720 A1 * | 4/2008 | Gentile et al. | 219/211 |

FOREIGN PATENT DOCUMENTS

| | | |
|---|---|---|
| DE | 19831574 C2 | 1/2000 |
| DE | 19954978 C1 | 1/2001 |
| DE | 10313165 A1 | 10/2004 |
| DE | 102006017732 A1 | 10/2007 |

OTHER PUBLICATIONS

German Office Action dated Jun. 3, 2009 in Case No. 10 2008 020 391.2-16.

* cited by examiner

REDUCED POWER HEAT MAT

BACKGROUND OF THE INVENTION

This invention relates in general to temperature controlled vehicle seating.

Cold and hot environmental conditions can result in similar temperatures on the surfaces of seats resulting in the discomfort of the seat occupant. Accordingly, seat heaters and/or seat coolers have been provided. The seat heaters and coolers are commonly integrated into seat backs and seat cushions. The seat heaters and coolers provide heating and cooling to the seat surfaces. The seat heaters and coolers are manually operated by the seat occupant or alternatively the seat heaters and coolers can operate autonomously following initial pre-set conditions by the seat occupant.

Typical seat heaters include a resistive electrical grid that produces heat when electrical power is applied thereto. The resistive electrical grid produces heat throughout the area in which the seat heater is integrated. Seat coolers typically include circulating conditioned (cooled/heated) or non-conditioned air by fans and specially vented areas for providing a flow of air through perforations in the seating surfaces of the seat. The cooling fans and specially vented areas cool the area in which the seat coolers are integrated. Typically, the seat heaters and coolers operate through the use of electrical power.

While seat heaters and coolers can be effective in heating and cooling areas of a seat, typical seat heaters and coolers can consume large amounts of electrical power. Thus, it would be desirable to provide an improved seat heater and cooler system that more efficiently heat and cool a seat.

SUMMARY OF THE INVENTION

This invention relates to a vehicle seat assembly including a seating surface, wherein the seating surface defines a plurality of temperature controlled zones. At least one electrically actuated heating/cooling source provides one of heating and cooling to the plurality of zones. A controller individually controls electrical power supplied from the source to each zone and is operative to reduce power consumption in one zone relative to another zone in accordance with a predetermined profile designed to limit the overall power consumption of the assembly.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
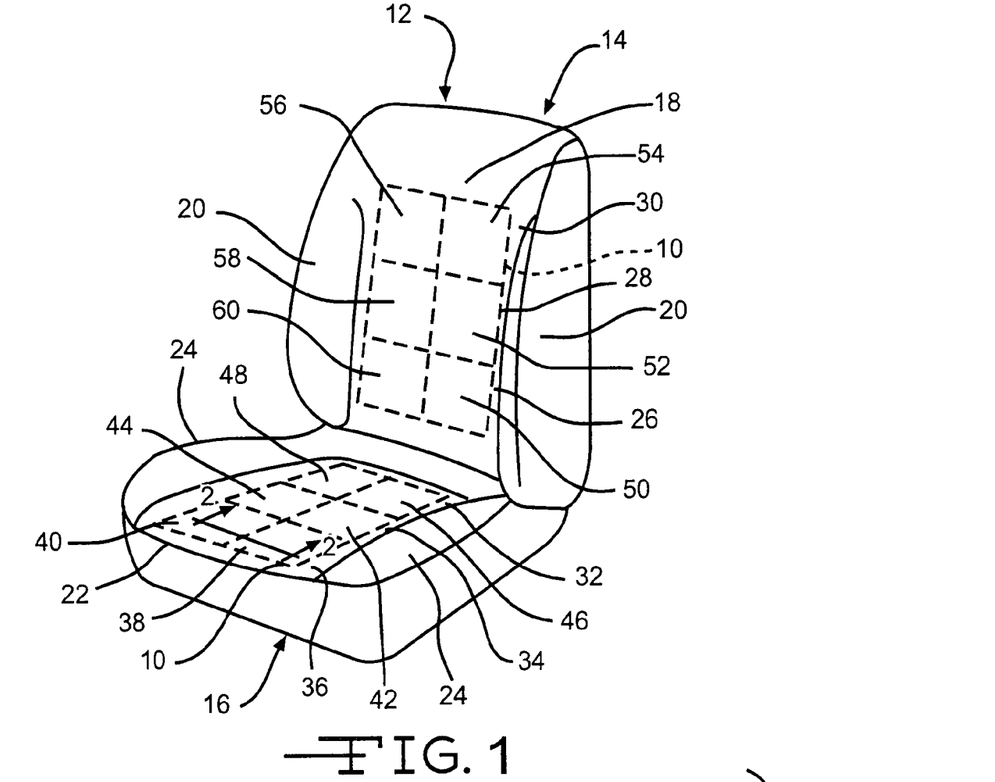
FIG. 1 is a perspective view of a seat having a reduced power heat mat in accordance with this invention.

Referring now to the drawings, there is illustrated in FIG. 1 a seat, indicated generally at 12, having a plurality of reduced power heat mats 10 in accordance with this invention. As will be explained in detail below, the plurality of reduced power heat mats 10 define one type of an electrically actuated heating/cooling source for providing heat to the seat 12 in an efficient manner.

As further shown in FIG. 1, the vehicle seat 12 includes a seat back 14 and a seat cushion 16. The seat back 14 includes a back support 18 and a plurality of back bolsters 20. The seat cushion 16 includes a seat support 22 and a plurality of seat bolsters 24. The back support 18 includes a low back area 26, mid back area 28 and upper back area 30. Similarly, the seat support 22 includes rear seat area 32, mid seat area 34 and front seat area 36.

In the embodiment shown in FIG. 1, a reduced power heat mat 10 is disposed in the back support 18 and in the seat support 22. Alternatively, a reduced power heat mat 10 can be disposed only in the back support 18 or only in the seat support 22. In yet another embodiment, a reduced power heat mat 10 can be disposed in any of the plurality of back bolsters 20 or seat bolsters 24.

As further shown in FIG. 1, the reduced power heat mat 10 disposed in the seat support 22 includes a plurality of zones 38, 40, 42, 44, 46 and 48. While the reduced power heat mat 10 positioned within seat support 22 has six zones, it should be understood that the reduced power heat mat 10 can contain more than six zones or less than six zones 30. In the illustrated embodiment, the zones 38 and 40 generally correspond to the front seat area 34, zones 42 and 44 generally correspond to the mid seat area 34 and zones 32 and 46 generally correspond to the rear seat area 32.

As further shown in FIG. 1, the reduced power heat mat 10 disposed in the back support 18 includes a plurality of zones 50, 52, 54, 56, 58 and 60. While the reduced power heat mat 10 positioned within the back support 18 has six zones, it should be understood that the reduced power heat mat 10 can contain more than six zones or less than six zones 30. In the illustrated embodiment, the zones 50 and 60 generally correspond to the lower back 26, zones 52 and 58 generally correspond to the mid back area 28 and zones 54 and 56 generally correspond to the upper seat area 30.

Figure 2:
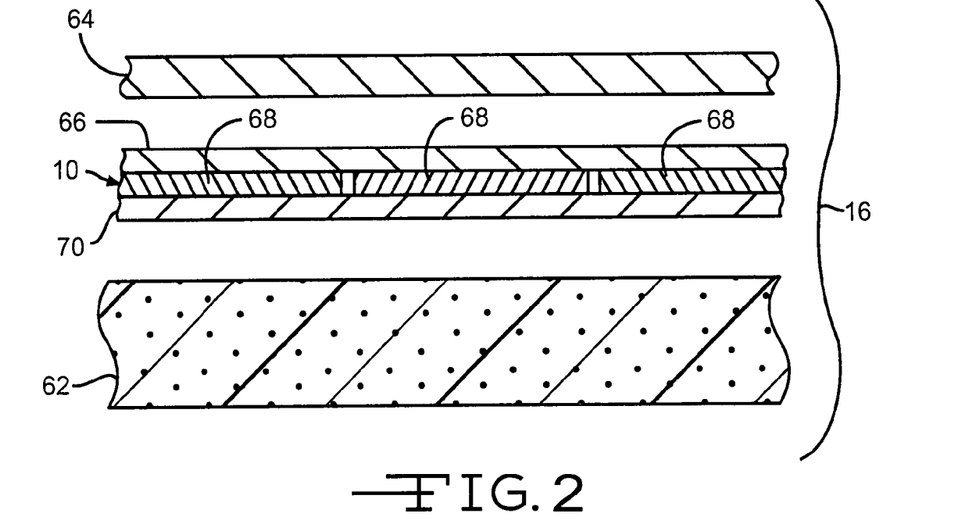
FIG. 2 is a front cross-sectional view of the seat and reduced power heat mat of FIG. 1.

As shown in FIG. 2, the seat cushion 16 includes a base material 62 covered by a seat trim covering 64. The base material 62 is adapted to provide padding to the seat cushion 16. In one embodiment, the base material 62 is a synthetic foam material. In another embodiment, the base material 62 can be another material sufficient to provide padding to the seat cushion 16. As shown in FIG. 2, the seat trim covering 64 is adapted to provide a protective and aesthetically pleasing cover. In one embodiment, the seat trim covering 64 is a fabric based material. In another embodiment, the seat trim covering 64 can be another material, such as for example leather, sufficient to provide a protective and aesthetically pleasing cover.

As further shown in FIG. 2, the seat cushion 16 also includes a reduced power heat mat 10. The reduced power heat mat 10 includes an upper layer 66, a plurality of heat sources 68 and a lower layer 70. The upper layer 66 and lower layer 70 are adapted to protect the plurality of heat source 68 from incidental damage and electrically isolate the heat sources 68 from other portions of the seat cushion 16. In the illustrated embodiment, the upper layer 66 and the lower layer 70 are made of a felt material. Alternatively, the upper layer 66 and the lower layer 70 can be another material, such as for example a fabric based material, sufficient to protect the plurality of heat source 68 from incidental damage and electrically isolate the heat sources 68 from other portions of the seat cushion 16. While FIG. 2 illustrates a space between the upper layer 66, the plurality of heat sources 68 and the lower layer 70, it should be understood that the upper layer 66 may be in contact with the plurality of heat sources 68, and the plurality of heat sources 68 may be in contact with the lower layer 70. While the illustrated embodiment shows an upper layer 66, a plurality of heat sources 68 and a lower layer 70, it should be understood that additional layers, such as for example a thermally reflective layer, can be used.

Figure 3:
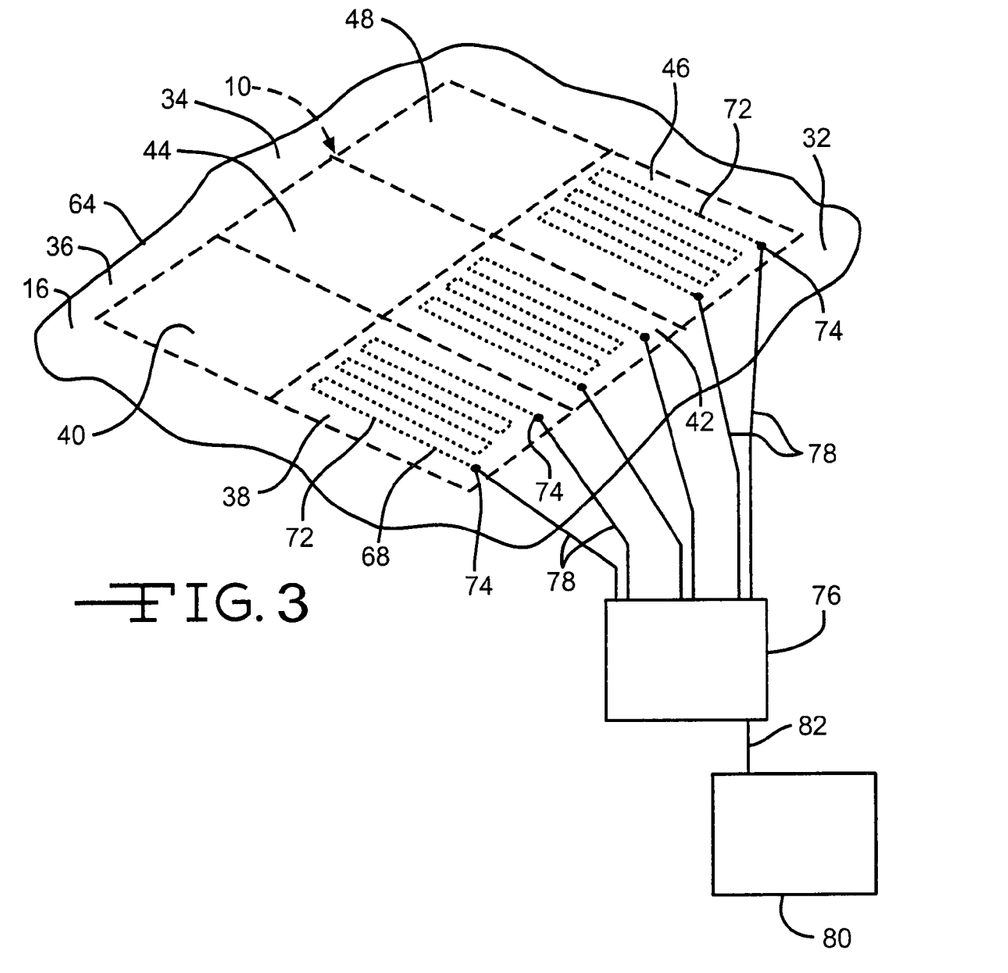
FIG. 3 is a perspective view of the seat illustrating the heating grid of the reduced power heat mat of FIG. 1.

Referring now to FIG. 3, a seat cushion 16 is shown including the seat trim covering 64 and the reduced power heat mat 10. As previously described, the seat cushion 16 includes rear seat area 32, mid seat area 34 and front seat area 36. The rear seat area 32 includes zones 48 and 46 of the reduced power heat mat 10, the mid seat area 34 includes zones 42 and 44 of the occupant sensing heat mat 10, and the front seat area 36 includes zones 38 and 40 of the reduced power heat mat 10.

As shown in FIG. 3, zones 38, 42 and 46 each include a heat source 68. The plurality of heat sources 68 are adapted to provide heat to the seat cushion 16. Although for clarity purposes, a heat source 68 is not shown in zones 40, 44 and 48, it should be understood that a heat source 68 is also included in zones 40, 44 and 48.

As illustrated in FIG. 3, each heat source 68 includes a resistive electric grid 72 and a plurality of grid terminals 74. In the illustrated embodiment, the resistive electric grid 72 is made of electrically resistant wires arranged in a pre-determined pattern. In another embodiment, the resistive electric grid can be made of another electrically resistant material, such as for example conductive carbon fiber, arranged in a pre-determined pattern. The resistive electric grid 72 is adapted to receive electric power through the grid terminals 74 and provide heat as the electric power flows through the grid 72. The resistive electric grids 72 are rated for a heating density according to the desired heating effect. In one embodiment, the resistive electric grids 72 are rated for a heating density in a range from about 200 watts/m$^2$ to about 1200 watts/m$^2$, where heat density is defined as the amount of heat dissipated for a given physical area. In another embodiment, the resistive electric grids 72 can be rated for a heating density of more than 1200 watts/m$^2$ or less than 200 watts/m$^2$.

In the illustrated embodiment, the resistive electric grids 72 use D.C. electrical power flowing through the grids 72 to produce heat. The direct current is in a range from about 0.5 amps to about 4.0 amps at a voltage in a range from about 6.0 volts to about 18.0 volts. In another embodiment, the resistive electric grids 72 can use another type of electric power, sufficient to flow through the grids 72 and provide heat.

While the heat sources 68 illustrated in FIG. 3 are resistive electric grids, it should be understood that other heat sources, such as for example thermal electric devices or conductive carbon fibers, sufficient to provide heat to the seat cushion 16 can be used as electrically actuated heating/cooling sources.

The grid terminals 74 are connected to a controller 76 by a plurality of grid connectors 78. As will be explained in detail later, the controller 76 is adapted to provide a plurality of functions. The controller 76 is connected to a power supply 80 by a plurality of power supply connectors 82. The power supply 80 is adapted to provide a supply of electrical power to the controller 76. In the illustrated embodiment, the power supply 80 provides D.C. electrical power. In another embodiment, the power supply 80 can provide another type of electrical power, such as for example A.C. power.

The controller 76 includes a master switch (not shown) adapted to turn the power supply 80 on and off. In the illustrated embodiment, the controller 76 controls the electrical power supplied to the resistive electric grids 72 by turning the power supply 80 on and off. The controller 76 also includes a power transfer switch (not shown) adapted to transfer electrical power applied from one zone to another zone. As described above, the seat cushion 16 includes rear seat area 32 having zones 46 and 48, mid seat area 34 having zones 42 and 44, and front seat area 36 having zones 38 and 40. The rear seat area 32 generally corresponds to the buttocks area of a seat occupant, the mid seat area 34 generally corresponds to the thigh area of a seat occupant, and the front seat area 36 generally corresponds to the knee area of a seat occupant. The electrical power applied to each of the heat sources 68 within the zones 38, 40, 42, 44, 46 and 48 is varied according to a pre-determined power management profile contained within the controller 76. The power management profile is adapted to reduce the overall power requirements of the reduced power heat mat 10 by energizing individual heat sources 68 or combinations of heat sources 68 for specific and sequential periods of time rather than energizing all of the heat sources 68 within all of the zones 38, 40, 42, 44, 46 and 48 at the same time.

In one example of a power management profile, electrical power is applied to the heat sources 68 in a sequential rotation starting with zones 46 and 48 corresponding to the buttocks area of the seat occupant, continuing with zones 42 and 44 corresponding to the thigh area of the seat occupant, and ending with zones 38 and 40 corresponding to the knee area of the seat occupant. In this embodiment, electrical power is applied to the heat sources 68 in the zones 46 and 48 in approximately 60% of the overall time, 25% of the time electrical power is applied to zones 42 and 44, and the remaining approximate 15% of the time electrical power is applied to zones 38 and 40. The division of time that the heat sources 68 in the zones have electrical power applied is defined as a power management profile. This example of a power management profile is graphically illustrated in FIG. 4. The first graph represents zones 46 and 48, the second graph represents zones 42 and 44 and the third graph represents zones 38 and 40. Each graph represents the temperature of the respective zones over time. Each graph includes time periods t1 through t10 and further includes a target zone temperature, designated as the set point temperature. In one embodiment, the time period t1 is approximately two minutes. In another embodiment, the time period t1 can be more or less than two minutes. The set point temperature is defined as the desired steady state temperature. The set point temperature is variable and can be set at any desired level. As shown in the first graph, electrical power applied to the heat sources 68 in zones 46 and 48 during the time period t1 causes the heat sources in zones 46 and 48 to heat. The temperature in zones 46 and 48 rises for the duration of the time period t1. As shown in the second and third graphs, electrical power is not applied to the heat sources 68 in zones 38, 40, 42 and 44 during the time period t1. At the conclusion of time period t1, the electrical power is cutoff from the heat sources 68 in zones 46 and 48.

Figure 4:
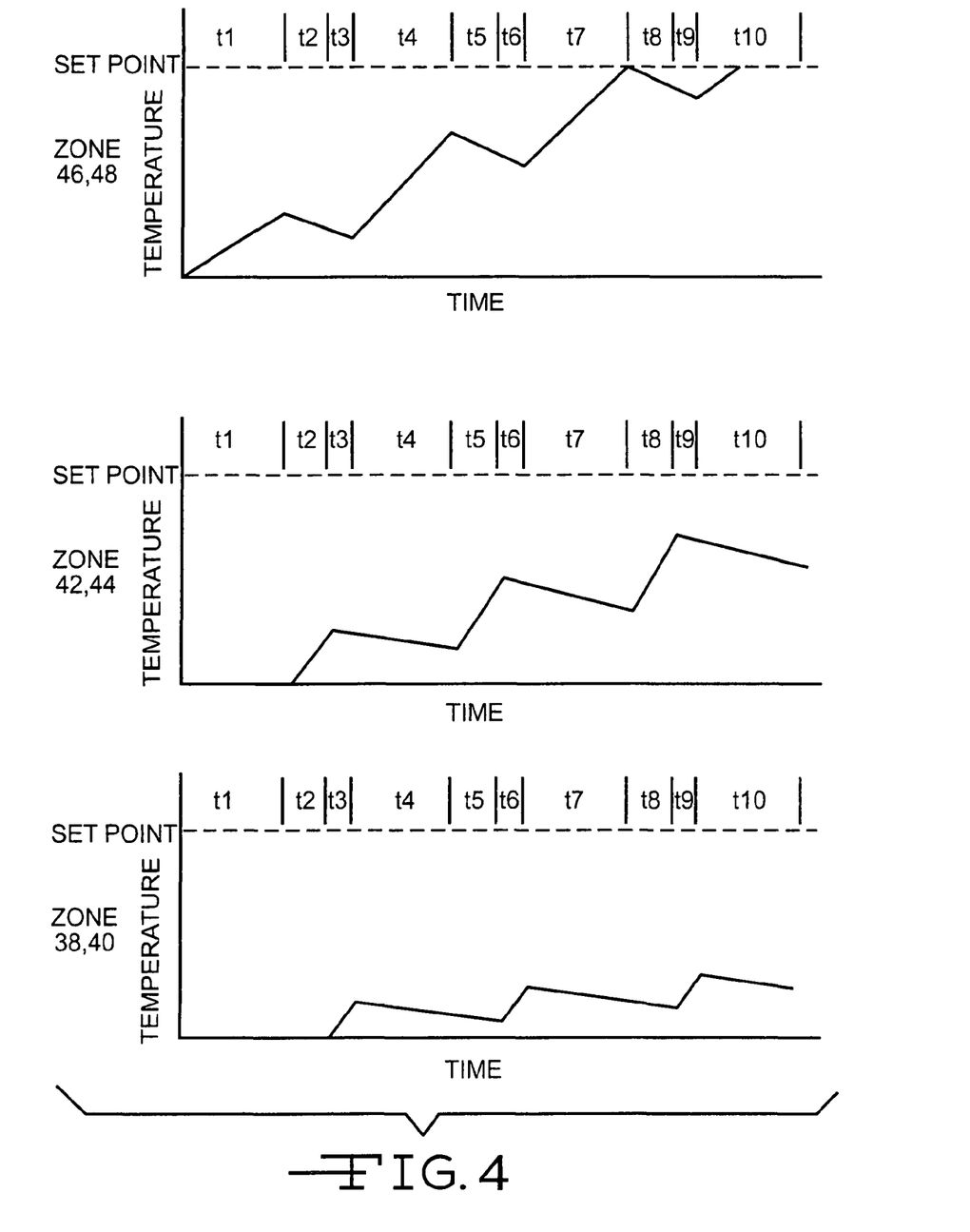
FIG. 4 is a series of graphs illustrating a heating sequence of heating grids of the reduced power heat mat of FIG. 1.

As further shown in FIG. 4 at the beginning of time period t2, the electrical power is transferred from the heat sources 68 in zones 46 and 48 to the heat sources 68 in zones 42 and 44. Electrical power still has not been applied to the heat sources in zones 38 and 40. Accordingly during time period t2, the heat sources 68 in zones 42 and 44 produce heat and the heat sources 68 in zones 46 and 48 start to cool. At the conclusion of time period t2, the electrical power is cutoff from the heat sources 68 in zones 42 and 44.

Still referring to FIG. 4, at the beginning of time period t3, the electrical power is transferred from the heat sources 68 in zones 42 and 44 to the heat sources 68 in zones 38 and 40. No electrical power is applied to the heat sources 68 in zones 46, 48, 42 and 44. Accordingly during time period t3, the heat sources in zones 38 and 40 produce heat and the heat sources 68 in zones 46, 48, 42 and 44 cool. At the conclusion of time period t3, the electrical power is cutoff from the heat sources 68 in zones 38 and 40. The conclusion of time period t3 completes one heating cycle. A heating cycle is defined as a series of time periods in which electrical power is applied on a sequential basis among all of the heat sources 68. The time periods are not required to be equal in length. The sequence of applying the electrical power is also variable. At the completion of the heating cycle, all of the heat sources 68 in zones 38, 40, 42, 44, 46 and 48 have had electrical power applied and all of the heat sources 68 have produced heat.

The time period t4 begins a new heating cycle and electrical power is again applied to the heat sources 68 in zones 46 and 48. The remainder of time period t4 and the time periods t5 and t6 complete the same heating cycle as time periods t1-t3. As further shown in FIG. 4, the completion of each heating cycle brings the temperature in each of the zones 38, 40, 42, 44, 46 and 48 closer to the set point temperature.

While not shown in FIG. 4 for simplicity purposes, it should be understood that the cycling of electrical power in time periods beyond t10 will continue until all of the zones 38, 40, 42, 44, 46 and 48 reach the set point temperature. At that time, the cycling of the electrical power among the zones 38, 40, 42, 44, 46 and 48 will maintain the set point temperature in the zones 38, 40, 42, 44, 46 and 48.

Besides the benefit of reducing overall power consumed by the reduced power heat mat 10, another benefit of the reduced power heat mat is the increase in perceived heat by the seat 12 occupant. Perceived heat is defined as heat recognized by a seat 12 occupant. In the illustrated embodiment, a seat 12 occupant will recognize the heat produced in the initial zones 46 and 48 corresponding to the rear seat area 32. The natural functioning of the human body tends to conduct the heat on the surface of the body to other areas of the body not experiencing the heat. As a result, a seat occupant perceiving heat in the rear seat area 32 will naturally conduct that heat to areas of the body corresponding to the mid seat area 34 and front seat area 36. At the end of time period t1 and the beginning of time period t2, the zones 46 and 48 have had an initial temperature increase and the zones 44 and 42 are starting to have a temperature increase. The seat 12 occupant will perceive an overall warming of the seat cushion 16 due to the perception of heat flowing from various zones. As the cycling of the heating of zones continues, the perception of the heat by the seat occupant will also increase.

In summary, each heating cycle involves a series of time periods in which electrical power is applied on a sequential basis among all of the heat sources. If the time periods are unequal in length, the sequential application of electrical power to the heat sources 68 causes some of the zones to be heated longer than other zones. The unequal time periods, the sequence of the zones and the set point temperature can be pre-determined to define a power management profile. In the preceding example of a power management profile, electrical power was first applied to the heat sources 68 in zones 46 and 48 for approximately 60% of the time in a heating cycle. Next, electrical power was applied to the heat sources 68 in zones 42 and 44 for approximately 25% of the time in a heating cycle. Finally, electrical power was applied to the heat sources 68 in zones 38 and 40 for approximately 15% of the time in a heating cycle.

In another embodiment, the power management profile can be pre-determined to provide a different set point temperature and different heating times for the heat sources in the respective zones, such as for example applying electrical power to zones 46 and 48 approximately 65% of the overall time, 25% of the time electrical power is applied to zones 42 and 44, and the remaining approximate 10% of the time electrical power is applied to zones 38 and 40.

In yet another embodiment, any combination of zones can be energized simultaneously for any length of time and at any set point temperature. As an example of this embodiment, electrical power can be simultaneously applied to zones 46, 48, 44, and 42 for approximately 70% of the overall time, and the remaining approximate 30% of the time electrical power is applied to zones 38 and 40.

While the embodiment shown in FIG. 4 includes transferring electrical power from the heat sources 68 in the various zones 38, 40, 42, 44, 46 and 48 based on a time variable, it should be understood that the transfer of electrical power from the heat sources 68 to other heat sources 68 can be triggered based on reaching the set point temperature before the end of a specific time period. As further shown in FIG. 4, during time period t10, electrical power is applied to the heat sources 68 in zones 46 and 48. During this time period, the temperature in zones 46 and 48 reach the set point temperature in the middle of the time period. At this time, a sensor (not shown) senses the temperature in zones 46 and 48 and signals the controller 76 as to the zone temperature. In the illustrated embodiment, the sensor is disposed in the upper layer 66 of the seat cushion 16. In another embodiment, the sensor can be positioned anywhere within the seat cushion 16 sufficient to sense the temperature in any of the zones 38, 40, 42, 44, 46 and 48.

If the controller 76 determines the set point temperature has been reached prior to the end of a time period, the controller 76 can transfer the electrical power from the heat sources in one zone to the heat source in another zone prior to the end of a specific time zone. Another benefit of the reduced power heat mat 10 is that only a single sensor (not shown) is required.

Figure 5:
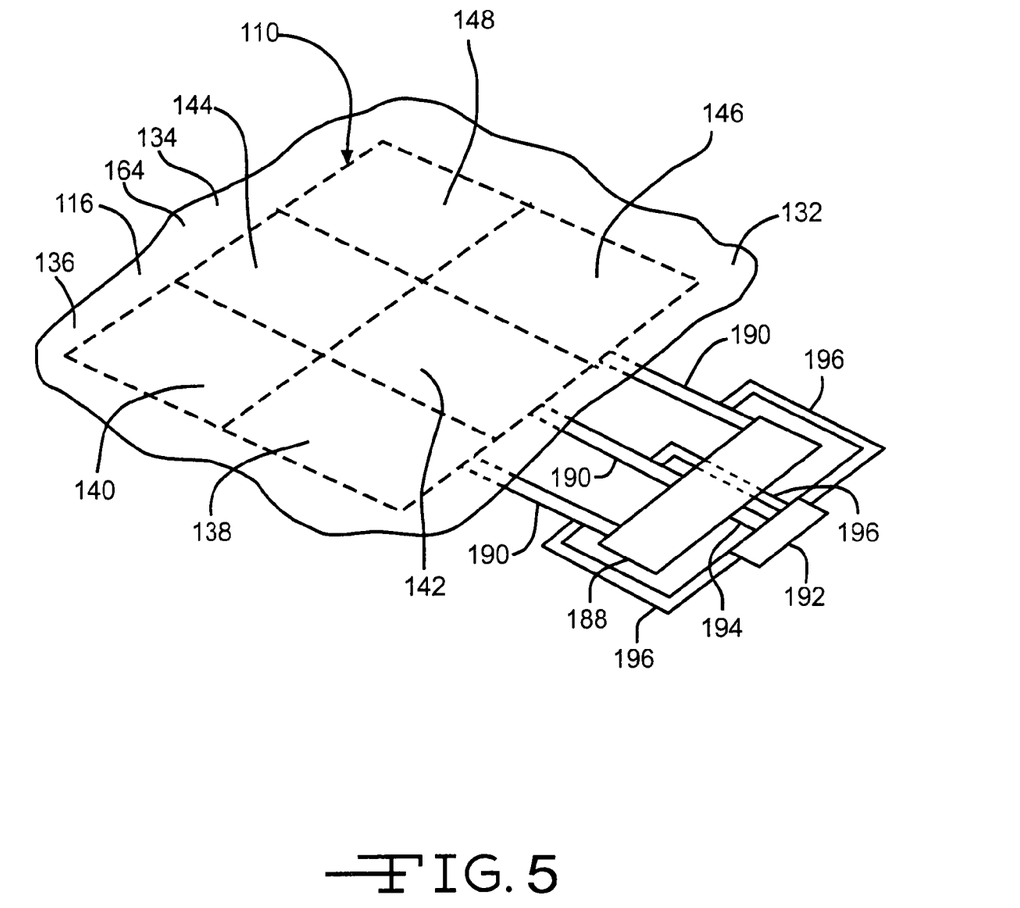
FIG. 5 is an alternate embodiment of the reduced power heat mat illustrating a cooling system.

In another embodiment, a seat cushion 116 can be cooled using a power management profile. As shown in FIG. 5, the seat cushion 116 is shown including a seat trim covering 164 and a cooling mat, schematically illustrated at 110. The seat cushion 116 includes rear seat area 132, mid seat area 134 and front seat area 136. The rear seat area 132 includes zones 148 and 146, the mid seat area 134 includes zones 142 and 144, and the front seat area 136 includes zones 138 and 140. The cooling mat 110 functions as an electrically actuated heating/cooling source providing cooling to the plurality of zones. The cooling mat 110 can be any suitable structure in the form of a relatively flat mat or can be any other structure, e.g. as conduits and perforation formed in seat for providing cooling and/or air flow to selected ones of the zones.

As further shown in FIG. 5, a cooling mechanism 188 is connected to the cooling mat 110 by a plurality of cooling ducts 190. The plurality of cooling ducts 190 connects each of the zones 138, 140, 142, 144, 146 and 148 to the cooling mechanism 188. The cooling mechanism 188 is adapted to provide cooled air to the cooling ducts 190. It should be understood that the term cooled air may include cabin air and/or conditioned air such as from a vehicle heating, ventilation, and air conditioning (HVAC) system. In the illustrated embodiment, the cooling mechanism 188 has a cooling capacity in a range from about 200 watts/m$^2$ to about 1200 watts/m$^2$. In another embodiment, the cooling mechanism 188 can have a cooling capacity of more than 1200 watts/m$^2$ or less than 200 watts/m$^2$. As illustrated in FIG. 5, the cooling mechanism 188 is a thermal electric device. In another embodiment, the cooling mechanism 188 is another device, such as for example a small air conditioner, sufficient to provide cooled air. The cooling mechanism 188 also includes a controller (not shown). The controller generally performs the same functions as the controller 76 described above.

Referring again to FIG. 5, a fan mechanism 192 is connected to the cooling mechanism by fan ducts 194. The fan mechanism 192 is adapted to provide a flow of air to the cooling mechanism 188. The flow of air to the cooling mechanism 188 being sufficient to urge the cooled air from the cooling mechanism 188 through the duct 190 to the cooling mat 110.

In a similar manner as described for the reduced power heating mat 10, the cooled air provided to the zones of the cooling mat can be sequential cycled, by the controller, between the zones of the cooling mat. The sequential cycling is set according to a pre-determined power management profile. The pre-determined power management profile determines the time each zone receives cooled air from the cooling mechanism 188 and the order in which the zones are cycled.

Additionally, a sensor (not shown) senses the temperature in the zones and signals the controller as to the zone temperature. If the controller determines a cooling set point temperature has been reached prior to the end of a cooling time period, the controller can cause the flow of air from the fan mechanism 192 to by-pass the cooling mechanism 188 through a plurality of fan by-pass ducts 196.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A vehicle seat assembly comprising:
  a vehicle seat having a seating surface, the seating surface including a rear seat area, a mid seat area, and a front seat area, the rear seat area, mid seat area, and front seat area including a plurality of temperature controlled zones;
  at least one electrically actuated heating/cooling source providing one of heating and cooling to the plurality of temperature controlled zones;
  a controller for individually controlling heating/cooling supplied from the source to each zone according to a power management profile; and
  a power supply configured to provide a supply of electrical power to the controller;
  wherein the power management profile is configured to sequentially apply power to the rear seat area for a first time period, to the mid seat area for a second time period and to the front seat area for a third time period, wherein the first time period is longer in duration than the second and third time periods, and wherein the second time period is longer in duration than the third time period.

2. The assembly of claim 1, wherein each of the plurality of zones includes a separate source for providing one of heating and cooling to the zone.

3. The assembly of claim 1, wherein the assembly includes a heat source disposed within each of the plurality of the zones.

4. The assembly of claim 1, wherein the assembly includes a cooling source directing air to each of the plurality of zones.

5. The assembly of claim 1 in which the source includes a resistive electric grid for providing heat.

6. The assembly of claim 5 in which the resistive electric grids have a heating density in a range from about 200 watts/m2 to about 1200 watts/m2.

7. The assembly of claim 6 in which the source includes a fan.

8. The assembly of claim 5 in which the resistive electric grids use D.C. electrical power to provide heat.

9. The assembly of claim 1, wherein the seat includes a seat cushion and a seat back, and wherein in which at least one of the zones is disposed within a seat cushion and at least one of the zones is disposed within a seat back.

10. The assembly of claim 1 in which the source is a thermal electric device.

11. The assembly of claim 1 in which the source has a cooling capacity in a range from about 200 watts/m2 to about 1200 watts/m2.

12. A method of heating/cooling a vehicle seat comprising the steps of:
  providing a vehicle seat having a seat portion, the seat portion including a rear seat area, a mid seat area, and a front seat area, the rear seat area, mid seat area, and front seat area having a plurality of temperature controlled zones;
  providing at least one heating/cooling source adapted to provide heating or cooling to the plurality of temperature controlled zones;
  providing a controller configured to individually control the heating/cooling supplied from each heating/cooling source to the temperature controlled zones according to a power management profile;
  providing a power supply configured to provide a supply of electrical power to the controller;
  energizing a quantity of the temperature controlled zones in the rear seat area for a first time period by providing electrical power while simultaneously preventing electrical power from the remaining temperature controlled zones;
  rotating power to the mid seat area for a second time period while simultaneously preventing electrical power from the remaining temperature controlled zones; and
  rotating power to the front seat area for a third time period while simultaneously preventing electrical power from the remaining temperature controlled zones;
  wherein the first time period is longer in duration than the second and third time periods, and wherein the second time period is longer in duration than the third time period.

13. A vehicle seat assembly comprising:
  a seat cushion having a rear seat area that is adapted to support a buttocks area of a seat occupant, a mid seat area that is adapted to support a thigh area of a seat occupant, and a front seat area that is adapted to support a knee area of a seat occupant;
  a seat back extending from the seat cushion and having a lower back area that is adapted to support a lower back area of a seat occupant, a mid back area that is adapted to support a mid back area of a seat occupant, and an upper back area that is adapted to support an upper back area of a seat occupant;
  a seat cushion temperature controlled zone provided within each of the rear seat area, the mid seat area, and the front seat area of the seat cushion, each of the seat cushion temperature controlled zones being selectively energizable to control the temperature of the associated area of the seat cushion;
  a seat back temperature controlled zone provided within each of the lower back area, the mid back area, and the upper back area of the seat back, each of the seat back temperature controlled zones being selectively energizable to control the temperature of the associated area of the seat back; and a controller connected to each of the seat cushion temperature controlled zones and each of the seat back temperature controlled zones, the controller energizing each of the seat cushion temperature controlled zones in accordance with a predetermined seat cushion profile, the controller also energizing each of the seat back temperature controlled zones in accordance with a predetermined seat back profile.

14. The vehicle seat assembly defined in claim 13 wherein only one of the seat cushion temperature controlled zones is energized at a time, and wherein only one of the seat back temperature controlled zones is energized at a time.

15. The vehicle seat assembly defined in claim 13 wherein the rear seat temperature controlled zone is energized for a first time period, the mid seat temperature controlled zone is energized for a second time period that is different from the first time period, and the front seat temperature controlled zone is energized for a third time period that is different from the first time period and the second time period.

16. The vehicle seat assembly defined in claim 15 wherein the first time period is longer than the second and third time periods, and wherein the second time period is longer than the third time period.

17. The vehicle seat assembly defined in claim 13 wherein the lower back temperature controlled zone is energized for a first time period, the mid back temperature controlled zone is energized for a second time period that is different from the first time period, and the upper back temperature controlled zone is energized for a third time period that is different from the first time period and the second time period.

18. The vehicle seat assembly defined in claim 17 wherein the first time period is longer than the second and third time periods, and wherein the second time period is longer than the third time period.

19. The vehicle seat assembly defined in claim 13 wherein the controller sequentially energizes the rear seat temperature controlled zone, the mid seat temperature controlled zone, and the front seat temperature controlled zone, and wherein the controller also sequentially energizes the lower back temperature controlled zone, the mid back temperature controlled zone, and the upper back temperature controlled zone.

20. The vehicle seat assembly defined in claim 13 wherein the controller only energizes one of the rear seat temperature controlled zone, the mid seat temperature controlled zone, and the front seat temperature controlled zone at a time, and wherein the controller also only energizes one of the lower back temperature controlled zone, the mid back temperature controlled zone, and the upper back temperature controlled zone at a time.

* * * * *